US008786589B2

(12) United States Patent

Park

(10) Patent No.: US 8,786,589 B2

(45) Date of Patent: Jul. 22, 2014

(54) ORGANIC ELECTROLUMINESCENT DISPLAY AND METHOD OF DRIVING THE SAME

(75) Inventor: Jung-Kook Park, Yongin (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 307 days.

(21) Appl. No.: 13/152,838

(22) Filed: Jun. 3, 2011

(65) Prior Publication Data

US 2011/0298782 A1 Dec. 8, 2011

(30) Foreign Application Priority Data

Jun. 4, 2010 (KR) ........................ 10-2010-0053026

(51) Int. Cl.

*G06F 3/038* (2013.01)

*G09G 5/00* (2006.01)

(52) U.S. Cl.

USPC .............................. 345/211; 345/76; 345/214

(58) Field of Classification Search

USPC .......... 345/211–215; 323/267, 282–285, 299, 323/351

See application file for complete search history.

(56) References Cited

U.S. PATENT DOCUMENTS

| | | | | |
|---|---|---|---|---|
| 7,821,246 B2 * | 10/2010 | Koertzen et al. | .............. | 323/349 |
| 2004/0027104 A1 * | 2/2004 | Ishii et al. | ..................... | 323/267 |
| 2006/0066531 A1 * | 3/2006 | Park et al. | ........................ | 345/76 |
| 2008/0158218 A1 * | 7/2008 | Kim | .............................. | 345/212 |
| 2008/0174287 A1 * | 7/2008 | Park | .............................. | 323/271 |
| 2009/0027375 A1 * | 1/2009 | Ryu et al. | ....................... | 345/212 |
| 2009/0147032 A1 * | 6/2009 | Kim | .............................. | 345/690 |
| 2010/0033467 A1 * | 2/2010 | Park | .............................. | 345/211 |
| 2010/0156871 A1 * | 6/2010 | Barrow | ......................... | 345/210 |

FOREIGN PATENT DOCUMENTS

| | | |
|---|---|---|
| JP | 2008-191539 (A) | 8/2008 |
| KR | 10-2007-0035388 A | 3/2007 |
| KR | 10-2007-0046506 (A) | 6/2007 |
| KR | 10-2007-0119930 A | 12/2007 |
| KR | 10-2008-0045192 (A) | 5/2008 |
| KR | 10-2008-0060527 (A) | 7/2008 |

OTHER PUBLICATIONS

Korean Office Action dated Oct. 26, 2011 for Korean Patent Application No. KR 10-2010-0053026 which corresponds to captioned U.S. Appl. No. 13/152,838.

* cited by examiner

*Primary Examiner* — Alexander Eisen

*Assistant Examiner* — Sanjiv D Patel

(74) *Attorney, Agent, or Firm* — Knobbe, Martens, Olson & Bear LLP

(57) ABSTRACT

An organic electroluminescent display and method of driving the display are disclosed. The display includes a power supply voltage generator which generates power voltages according to both a temperature of the display and a luminance level setting.

13 Claims, 4 Drawing Sheets

ORGANIC ELECTROLUMINESCENT DISPLAY AND METHOD OF DRIVING THE SAME

CROSS-REFERENCE TO RELATED APPLICATIONS

This application claims the benefit of Korean Patent Application No. 10-2010-0053026, filed on Jun. 4, 2010, in the Korean Intellectual Property Office, the disclosure of which is incorporated herein in its entirety by reference.

BACKGROUND

1. Field

The disclosed technology relates to an organic electroluminescent display and a method of driving the same.

2. Description of the Related Technology

Various flat panel displays have been recently developed. The flat panel displays have less weight and volumes than cathode ray tubes. Examples of flat panel displays include liquid crystal displays, field emission displays, plasma display panels, and organic electroluminescent displays.

The organic electroluminescent displays render an image by using organic light emitting diodes (OLEDs) that generate light according to recombination of electrons and holes. Such organic electroluminescent displays have excellent color reproducibility, thin profiles, etc., and thus are widely used not only for televisions and mobile phones, but also for personal digital assistants (PDAs), MPEG audio layer-3 (MP3) players, and digital cameras.

Organic electroluminescent displays consume power and display with a brightness which is related to direct current (DC) power supplies, ELVDD and ELVSS. If the difference between ELVDD and ELVSS is greater, higher power consumption and higher brightness may be achieved.

SUMMARY OF CERTAIN INVENTIVE ASPECTS

One inventive aspect is an organic electroluminescent display. The display includes a pixel unit with a plurality of scanning lines arranged in a row direction, a plurality of data lines arranged in a column direction, and a plurality of pixels respectively disposed near intersections of the plurality of scanning lines and the plurality of data lines. The display also includes a DC-DC converter configured to determine a first power voltage and a second power voltage and to supply the first and second power voltages to the plurality of pixels, where the voltage difference between the first and second power voltages is determined based on a control signal. The display also includes a DC-DC converter controller, having a temperature sensor configured to measure a peripheral temperature of the organic electroluminescent display, a register configured to store a luminance level setting of the pixel unit according to an input of a user, a selector configured to select a voltage difference level according to the peripheral temperature measured by the temperature sensor and the luminance level setting of the register, and a signal generator configured to generate the control signal based on the selected voltage difference level.

Another inventive aspect is a method of driving an organic electroluminescent display. The method includes measuring a peripheral temperature of the organic electroluminescent display, determining a luminance level setting of a pixel unit according to an input of a user, selecting a voltage difference level according to the measured peripheral temperature and the luminance level setting, and generating a control signal for a DC-DC converter based on the selected voltage difference level.

Another inventive aspect is an organic electroluminescent display. The display includes a pixel unit with a plurality of pixels, and a DC-DC converter configured to generate a first power voltage and a second power voltage and to supply the first and second power voltages to the plurality of pixels, where the voltage difference between the first and second power voltages is determined based on a temperature of the display and according to a luminance level setting.

BRIEF DESCRIPTION OF THE DRAWINGS

The above and other features and advantages will become more apparent through the description below which makes reference to the attached drawings in which.

DETAILED DESCRIPTION OF CERTAIN INVENTIVE EMBODIMENTS

Figure 1:
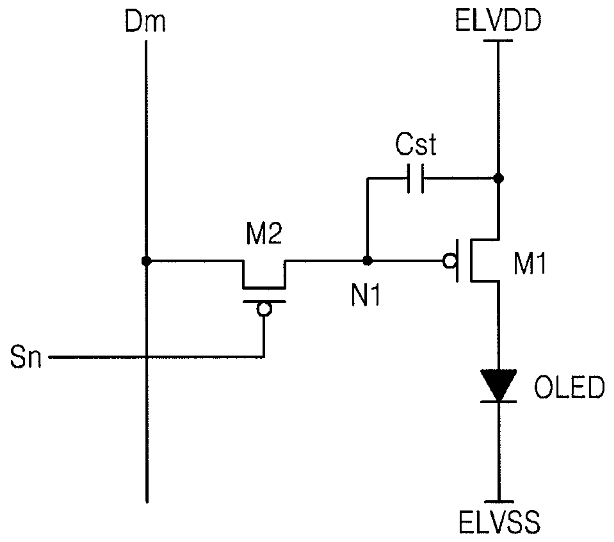
FIG. 1 is a circuit diagram illustrating a structure of a pixel included in an organic electroluminescent display, according to an embodiment.

Because various changes and numerous embodiments are encompassed by the various inventive aspects and principles, only particular embodiments will be illustrated in the drawings and described in detail. However, this is not intended to limit the present invention to particular modes of practice, and it is to be appreciated that changes, equivalents, and substitutes that do not depart from the spirit and technical scope of the disclosure are encompassed.

While such terms as "first," "second," etc., may be used to describe various components, such components are not be limited to the above terms. The above terms are used only to distinguish one component from another.

The terms used in the present specification are merely used to describe particular embodiments. An expression used in the singular encompasses the expression of the plural, unless it has a clearly different meaning in the context. In the present specification, it is to be understood that the terms such as "including" or "having," etc., are intended to indicate the existence of the indicated features, numbers, steps, actions, components, parts, or combinations thereof disclosed in the specification, and are not intended to preclude the possibility that one or more other features, numbers, steps, actions, components, parts, or combinations thereof may exist or may be added.

Various aspects may be described in terms of functional block components and various processing steps. Such functional blocks may be realized by any number of hardware and/or software components configured to perform the specified functions. For example, embodiments may employ various integrated circuit components, e.g., memory elements, processing elements, logic elements, look-up tables, and the like, which may carry out a variety of functions under the control of one or more microprocessors or other control devices. Similarly, where the elements of the embodiments are implemented using software programming or software elements the embodiments may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the various embodiments could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

Reference will now be made in detail to certain embodiments, examples of which are illustrated in the accompanying drawings, wherein like reference numerals generally refer to like elements throughout.

Embodiments are described with reference to organic electroluminescent displays, but the embodiments may also be applied to other various flat panel displays.

FIG. 1 is a circuit diagram illustrating a structure of a pixel included in an organic electroluminescent display, according to an embodiment. Other pixel structures may be used.

Referring to FIG. 1, the pixel includes a pixel circuit including a first transistor M1, a second transistor M2, a storage capacitor Cst, and an organic light emitting diode OLED.

The first transistor M1 has a source terminal connected to a first power voltage ELVDD, a drain terminal connected to the organic light emitting diode OLED, and a gate terminal connected to a first node N1. The second transistor M2 has a source terminal connected to a data line Dm, a drain terminal connected to the first node N1, and a gate terminal connected to a scanning line Sn. The storage capacitor Cst has a first terminal connected to the first power voltage ELVDD and a second terminal connected to the first node N1. The organic light emitting diode OLED includes an anode, a cathode, and a light-emitting layer, wherein the anode is connected to the drain terminal of the first transistor M1 and the cathode is connected to a second power voltage ELVSS. When a current flows from the anode to the cathode in the organic light emitting diode OLED, the light-emitting layer emits light according to the current. Equation 1 below defines a current flowing through the drain terminal of the first transistor M1.

$$I_d = \frac{\beta}{2}(ELVDD - Vdata - Vth)^2 \quad \text{Equation 1}$$

Here, $I_d$ denotes a current flowing through the drain terminal of the first transistor M1, Vdata denotes a voltage of a data signal, ELVDD denotes the first power voltage transmitted to the source terminal of the first transistor M1, Vth denotes a threshold voltage of the first transistor M1, and β denotes a constant.

Figure 2:
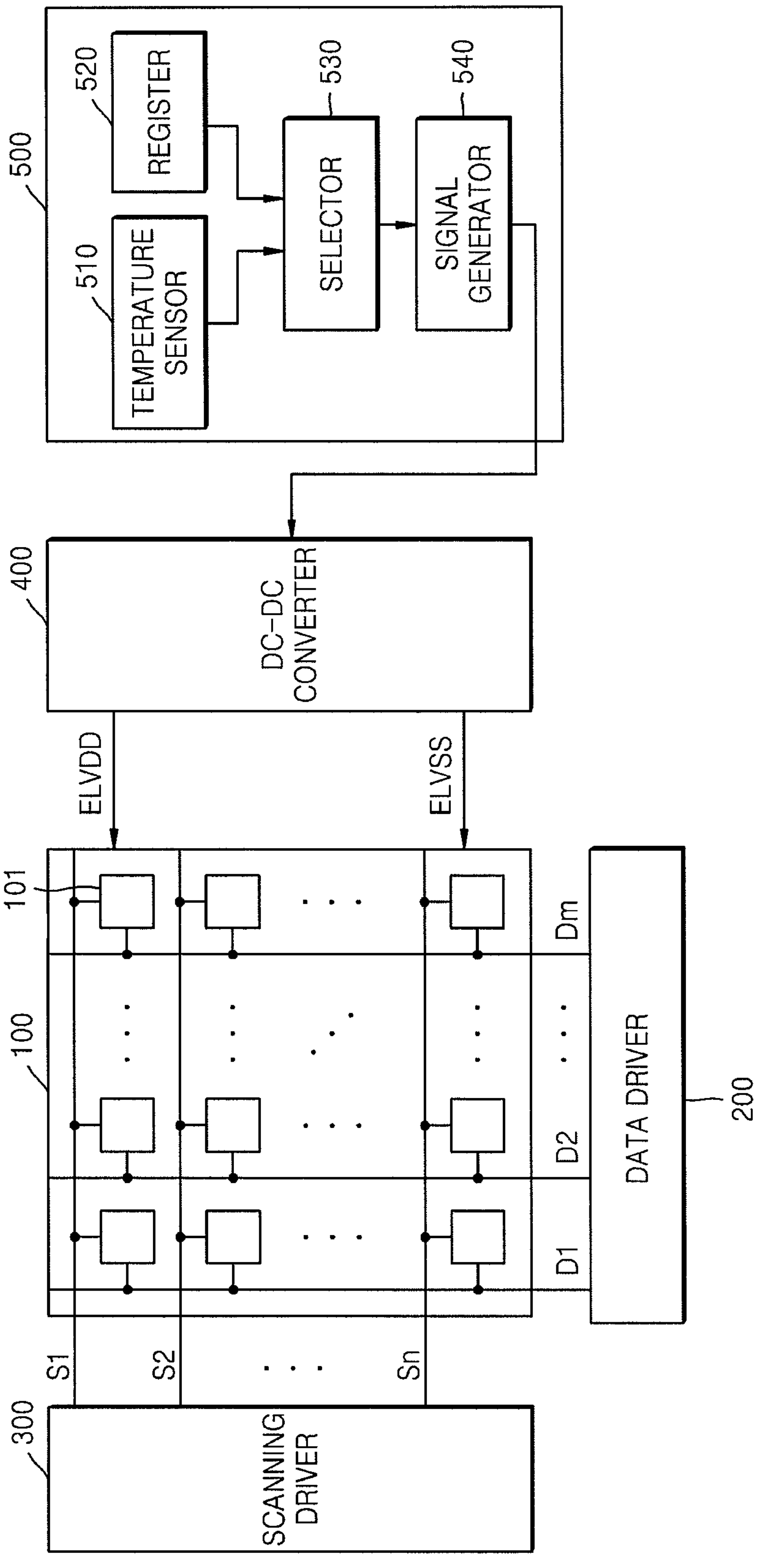
FIG. 2 is a block diagram of the organic electroluminescent display according to an embodiment.

FIG. 2 is a block diagram of the organic electroluminescent display according to an embodiment.

Referring to FIG. 2, the organic electroluminescent display includes a pixel unit 100, a data driver 200, a scanning driver 300, a DC-DC converter 400, and a DC-DC converter controller 500.

A plurality of pixels 101 are arranged in the pixel unit 100, and each pixel 101 includes an organic light emitting diode OLED that emits light according to a current. Also, n scanning lines S1 through Sn, which are arranged in a row direction and transmit a scanning signal, and m data lines D1 through Dm, which are arranged in a column direction and transmit a data signal, are arranged in the pixel unit 100. Also, each pixel 101 drives its organic light emitting diode OLED by receiving a power voltage, i.e., the first power voltage ELVDD and the second power voltage ELVSS from the DC-DC converter 400. Accordingly, the pixel unit 100 displays an image by emitting light from the organic light emitting diode OLED of each pixel 101 in response to receiving the scanning signal, the data signal, the first power voltage ELVDD, and the second power voltage ELVSS.

The data driver 200 is used to apply the data signal to each pixel 101. The data driver 200 generates the data signal based on received video data, for example, RGB data. Also, the data driver 200 applies the generated data signal through the data lines D1 through Dm of the pixel unit 100 to each pixel 101.

The scanning driver 300 is used to apply the scanning signal to each pixel 101. The scanning driver 300 is connected to the scanning lines S1 through Sn and transmits the scanning signal to each pixel 101. The pixel 101, which has received the scanning signal, receives the data signal output from the data driver 200, and a driving current is generated by the pixel circuit of the pixel 101. The driving current flows to the organic light emitting diode OLED of the pixel 101, and in response, the organic light emitting diode OLED emits light.

The DC-DC converter 400 receives a voltage from a power generator (not shown), generates the first and second power voltages ELVDD and ELVSS for the pixel unit 100, and transmits the first and second power voltages ELVDD and ELVSS to the pixel unit 100. The first power voltage ELVDD is transmitted to a first power voltage line of the pixel 101, and the second power voltage ELVSS is transmitted to a second power voltage line of the pixel 101.

The DC-DC converter controller 500 generates a control signal for controlling voltage levels of the first and second power voltages ELVDD and ELVSS generated by the DC-DC converter 400, according to a peripheral temperature and a luminance level of the pixel unit 100. In detail, the DC-DC converter controller 500 includes a temperature sensor 510 for measuring a peripheral temperature of the organic electroluminescent display, a register 520 for storing a luminance level of the pixel unit 100 according to a setting of a user, a selector 530 for selecting a voltage level according to the peripheral temperature measured by the temperature sensor 510 and the luminance level stored in the register 520, and a signal generator 540 for generating a control signal for the DC-DC converter 400 to use for generating the first and second power voltages ELVDD and ELVSS according to the voltage level selected by the selector 530. The DC-DC converter controller 500 may be realized as a separate driver integrated circuit (IC), but is not limited thereto and may, for example, be integrated with the DC-DC converter 400.

Figure 3:
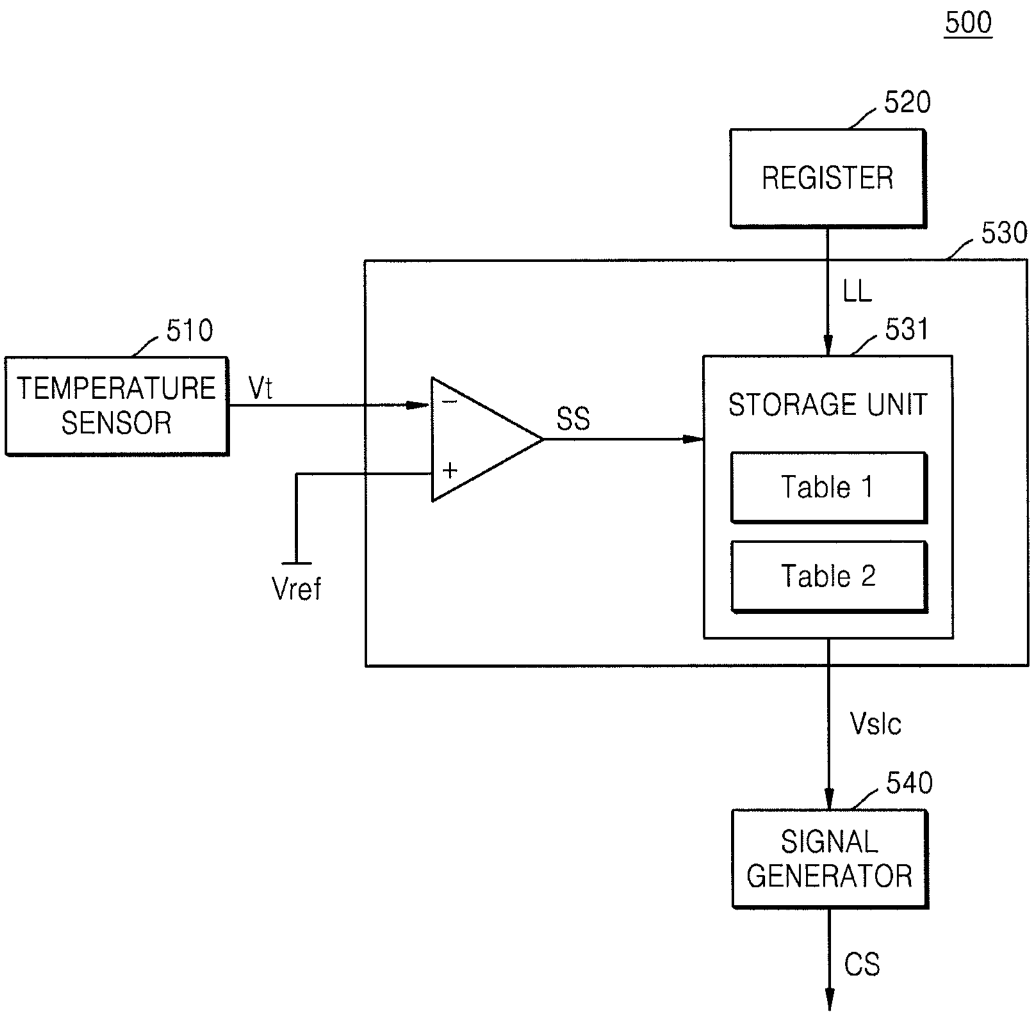
FIG. 3 is a block diagram of a DC-DC converter controller of FIG. 2.

FIG. 3 is a block diagram of the DC-DC converter controller 500 of FIG. 2, according to an embodiment of the present invention Referring to FIG. 3, the DC-DC converter controller 500 according to some embodiments includes the temperature sensor 510, the register 520, the selector 530 including a storage unit 531 and an amplifier, and the signal generator 540.

The temperature sensor 510 measures a peripheral temperature of the organic electroluminescent display, and transmits a temperature measurement signal corresponding to the measured peripheral temperature to the selector 530. The temperature sensor 510 may be, for example, installed outside the organic electroluminescent display. Alternatively, the temperature sensor 510 may be installed in the DC-DC converter controller 500 as a driver IC and be configured to measure the peripheral temperature of the organic electroluminescent display. Here, the temperature measurement signal may be a voltage of a certain level. For example, when the temperature sensor 510 measures the peripheral temperature to be 25° C., the temperature sensor 510 may transmit a voltage Vt of a first level corresponding to 25° C. as the temperature measurement signal.

The register 520 stores a luminance level setting for the pixel unit 100. According to some embodiments, a luminance level setting selected by the user is stored in register 520. For example, the user may set the luminance level of the pixel unit 100 to be 200 cd/$m^2$. In response, the register 520 stores the luminance level setting of 200 cd/$m^2$.

The luminance level setting may, for example, correspond to a brightness of the entire surface of the pixel unit 100. Alternatively, the luminance level setting may, for example, correspond to a brightness of a center or some other portion of the surface of the pixel unit 100, and may be defined while manufacturing the organic electroluminescent display. A unit of the luminance level may be cd/$m^2$ or nit. When the luminance level is high, the pixel unit 100 is bright, and when the luminance level is low, the pixel unit 100 is dark.

The selector 530 includes the storage unit 531 that stores in each table voltage difference levels corresponding to a plurality of potential luminance level settings in register 520. The storage unit 531 has at least two tables, and selects one of the tables according to the measured peripheral temperature of the organic electroluminescent display as sensed by temperature sensor 510 and according to a reference voltage Vref. The storage unit 531 also selects a voltage difference level from the selected table according to the luminance level setting of register 520.

Each table includes voltage difference levels or an indication of voltage difference levels corresponding to the peripheral temperature for the table. The storage unit 531 stores a plurality of tables, which have different voltage difference level characteristics according to temperature. One of the plurality of tables is selected according to the temperature measurement signal received from the temperature sensor 510.

According to some embodiments, there are two tables. The first is for when the measured peripheral temperature is higher than a reference temperature and the second is for when the measured peripheral temperature is lower than the reference temperature.

The first table is selected when the measured peripheral temperature is higher than the reference temperature, and may be as Table 1 below. In Table 1, the voltage difference level decreases as the luminance level setting decreases, and increases as the luminance level setting increases. Accordingly, voltage difference level D, which is selected when the luminance level setting is 100, is lower than a voltage difference level A, which is selected when the luminance level setting is 400. This is beneficial because when the pixel unit 100 is dark, the difference between the first power voltage ELVDD and the second power voltage ELVSS applied to the pixel unit 100 can be reduced to reduce power consumption. Accordingly, in Table 1, a low voltage difference level is selected when the luminance level setting is low, and a high difference voltage level is selected when the luminance level setting is high.

TABLE 1

| Luminance Level Setting (cd/$m^2$) | Voltage Difference Level (V) |
|---|---|
| 400 | A |
| 300 | B |
| 200 | C |
| 100 | D |

The second table is selected when the measured peripheral temperature is lower than the reference temperature, and may be as Table 2 below. In Table 2, as in Table 1, the voltage difference level decreases as the luminance level setting decreases, and increases as the luminance level setting increases. Accordingly, voltage difference level H, which is selected when the luminance level setting is 100, is lower than a voltage difference level E, which is selected when the luminance level is 400.

The voltage difference levels of Table 1 are lower than corresponding voltage difference levels of Table 2. For example, when the luminance level setting is 400 cd/$m^2$, the voltage difference level E of Table 2 is higher than the voltage difference level A of Table 1. This is beneficial because when the peripheral temperature is lower than the reference temperature, current characteristics of the driving transistors in the pixels deteriorate, such that less current is sourced to the organic light emitting diodes in the pixels. To compensate for the lower current, the DC-DC converter 400 may output the first power voltage ELVDD and the second power voltage ELVSS having a larger difference. In order to output the first power voltage ELVDD and the second power voltage ELVSS with a larger difference, a voltage difference level selected from the table may be high. Accordingly, voltage levels in Table 1 and Table 2 described above have following characteristics. At the same luminance level setting, voltage difference levels are higher when the measured peripheral temperature is lower than the reference temperature and are lower when the measured peripheral temperature is higher than the reference temperature. The luminance level settings and voltage difference levels according to the luminance level settings shown in Tables 1 and 2 are only an example, and the embodiments are not limited thereto. Also, a plurality of tables as Tables 1 and 2 may exist for selection according to sensed temperature. For example, when the reference temperature is 0° C., Table 1 may be selected if the sensed temperature is any of 5° C., 10° C., and 15° C., which are higher than the reference temperature. Also, Table 2 may be selected if the sensed temperature is −5° C., −10° C., and −15° C., which are lower than the reference temperature.

TABLE 2

| Luminance Level (cd/$m^2$) | Voltage Level (V) |
|---|---|
| 400 | E |
| 300 | F |
| 200 | G |
| 100 | H |

The selector 530 receives the temperature measurement signal from the temperature sensor 510, and compares the temperature measurement signal with the reference temperature. The temperature measurement signal may be a voltage of a certain level, and thus may be indicated by $V_T$, and the reference temperature may be indicated by a reference voltage Vref. The reference voltage Vref may be a voltage corresponding to a reference temperature which may be an inflection point. The reference temperature may be 0° C. or 25° C., but is not limited thereto. The selector 530 may include a comparator, which outputs a selection signal SS generated by comparing the temperature measurement signal $V_T$ and the reference voltage Vref. For example, when the measured peripheral temperature is higher than the reference temperature, the temperature measurement signal $V_T$ is higher than the reference voltage Vref and the selection signal SS of a first level is output. Alternatively, when the measured peripheral temperature is lower than the reference temperature, the temperature measurement signal $V_T$ is lower than the reference voltage Vref, and the selection signal SS of a second level is output. The selector 530 selects one table from the storage unit 531 based on the selection signal SS. For example, when the selection signal SS of the first level is received, the first table, Table 1, is selected, and when the selection signal SS of the second level is received, the second table, Table 2, is selected. Also, the selector 530 receives a luminance level setting LL from the register 520. The luminance level setting LL may be based on the setting of the user.

The selector 530 selects a voltage difference level Vslc corresponding to the luminance level setting LL from the selected table. For example, the selector 530 may select the first table because the selection signal SS has the first level because the measured peripheral temperature is higher than the reference temperature. In this case, the selector 530 selects the voltage difference level Vslc corresponding to the luminance level setting LL from the selected first table. For example, when the first table has the values of Table 1, and the luminance level setting LL of 200 cd/$m^2$ is received, a voltage level C is selected as the voltage difference level Vslc. On the other hand, the selector 530 may select the second table because the selection signal SS has the second level because the measured peripheral temperature is lower than the reference temperature. In this case, the selector 530 selects the voltage difference level Vslc corresponding to the luminance level setting LL from the selected second table. For example, when the second table has the values of Table 2, and the luminance level setting LL of 200 cd/$m^2$ is received, a voltage level G is selected as the voltage difference level Vslc. The selected voltage difference level Vslc is then applied to the signal generator 540. In some embodiments, the process of selecting the voltage difference level Vslc from the table may be performed by a demultiplexer (DEMUX).

The signal generator 540 generates a control signal CS for generating the first power voltage ELVDD and the second power voltage ELVSS according to the voltage difference level Vslc selected by the selector 530, and applies the control signal CS to the DC-DC converter 400. The DC-DC converter 400 generates the first and second power voltages ELVDD and ELVSS according to the applied control signal CS, and supplies the first and second power voltages ELVDD and ELVSS to the pixel unit 100. The control signal CS adjusts a voltage difference between the first and second power voltages ELVDD and ELVSS. For example, if a relatively low voltage difference level Vslc is selected from the table, the first and second power voltages ELVDD and ELVSS are generated with a relatively low voltage difference and are applied to the pixel unit 100. Alternatively, if a relatively high voltage difference level Vslc is selected from the table, the first and second power voltages ELVDD and ELVSS are generated with a relatively high difference and are applied to the pixel unit 100.

Figure 4:
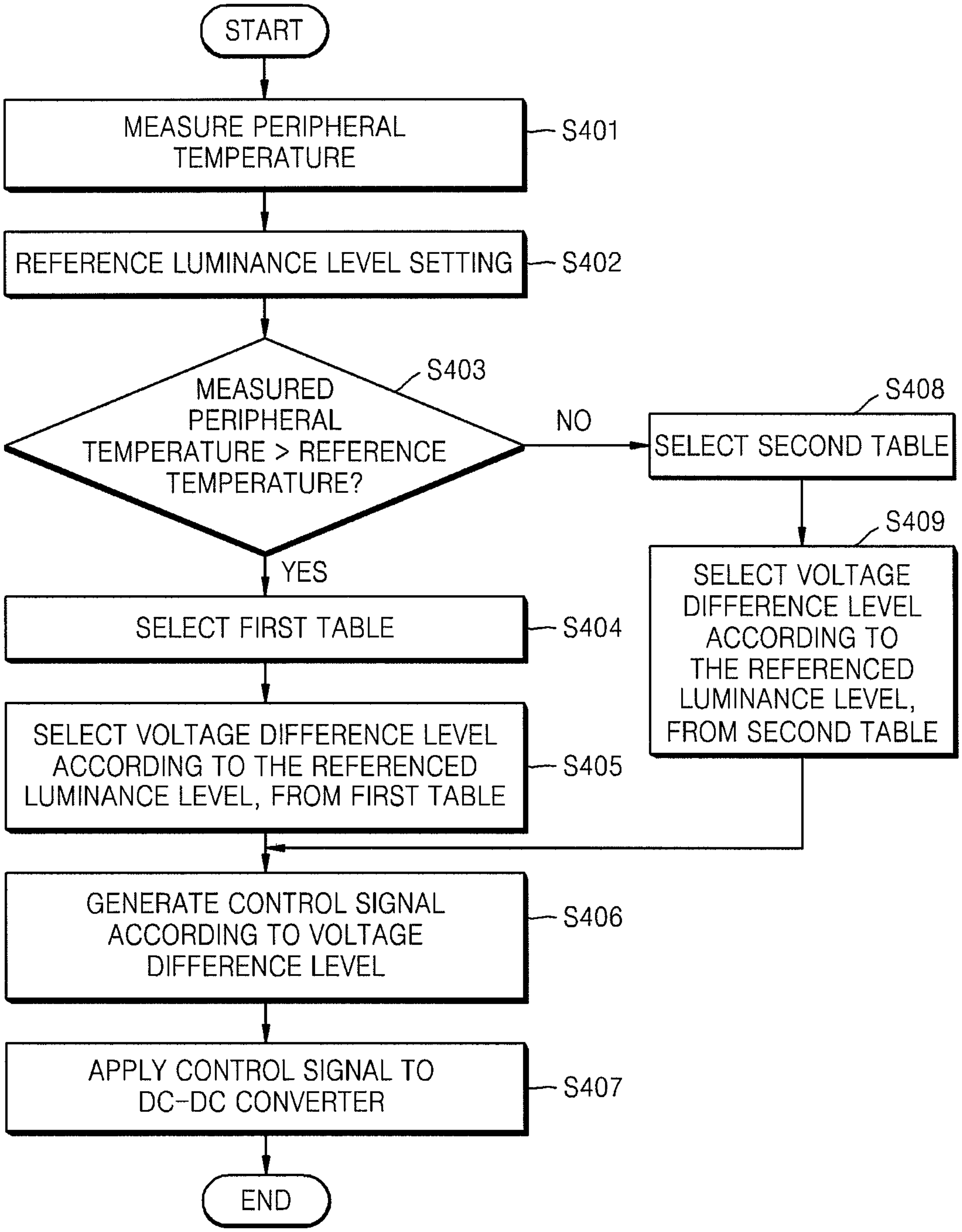
FIG. 4 is a flowchart illustrating a method of driving an organic electroluminescent display, according to an embodiment.

FIG. 4 is a flowchart illustrating a method of driving a DC-DC converter for generating power voltages for an organic electroluminescent display, according to an embodiment.

Referring to FIG. 4, the method includes measuring a peripheral temperature of the organic electroluminescent display, referencing a luminance level setting for the pixel unit 100 according to a setting of a user, selecting a voltage difference level according to the measured peripheral temperature and the luminance level setting, generating a control signal for generating a power voltage according to the selected voltage difference level, and applying the generated control signal to the DC-DC converter 400. As described above, the DC-DC converter 400 generates power voltages according to the control signal.

The temperature sensor 510 measures the peripheral temperature of the organic electroluminescent display in operation S401. The temperature sensor 510 may be outside the organic electroluminescent display, or may, for example, be in the DC-DC converter controller 500 as a driver integrated circuit.

Next, the luminance level setting stored in the register 520 is referenced in operation S402. The luminance level setting may be a value input by the user through an input unit, and a unit of the luminance level may, for example, be cd/$m^2$ or nit.

The selector 530 selects the voltage difference level according to the measured peripheral temperature and the referenced luminance level setting. To select the voltage difference level, the selector 530 compares the peripheral temperature and a reference temperature in operation S403. Then, a table is selected according to the result of comparison in operation S404 or S408. One of the voltage difference levels from the selected table is selected in operation S405 or S409 according to the referenced luminance level setting. In the tables a high luminance level setting corresponds to a high voltage difference level. The tables are selected according to peripheral temperature. One table is selected if the peripheral temperature is higher than the reference temperature and the other table is selected if the peripheral temperature is lower than the reference temperature. In some embodiments, the table may store the luminance level settings and voltage difference levels according to temperatures.

If the peripheral temperature is higher than the reference temperature, a first table is selected in operation S404. The first table may have the values shown in Table 1 above. The selector 530 selects a voltage difference level corresponding to the luminance level setting from the register 520 in the first table in operation S405. Then, the signal generator 540 receives the selected voltage difference level, and generates a control signal corresponding to the received voltage difference level in operation S406. The signal generator 540 applies the generated control signal to the DC-DC converter 400 in operation S407. The DC-DC converter 400 generates the first power voltage ELVDD and the second power voltage ELVSS having voltage levels based on the control signal.

Otherwise, if the peripheral temperature is lower than the reference temperature, a second table is selected in operation S408. In some embodiments, the peripheral temperature may be identical to the reference temperature when selecting the second table. The second table may have the values shown in as Table 2 above. Then, the selector 530 selects the voltage difference level corresponding to the luminance level setting from the register 520 in the second table in operation S409. Next, operations S406 and S407 described above are performed.

According to an embodiment, because the peripheral temperature of the organic electroluminescent display and the luminance level setting of the pixel unit 100 are used to determine the voltage difference between the first and second power voltages ELVDD and ELVSS output from the DC-DC converter 400 is adjusted. Accordingly, power consumption may be reduced by adjusting the first and second power voltages ELVDD and ELVSS according to the peripheral temperature of the organic electroluminescent display and the luminance level setting of the pixel unit 100.

In conventional displays, because constant power voltages are output from the DC-DC converter 400 regardless of the peripheral temperature of the organic electroluminescent display and a luminance level setting of the pixel unit 100, unnecessary power is consumed. However, by adjusting the power consumption according to the peripheral temperature of the organic electroluminescent display and the luminance level setting of the pixel unit 100, as described above, in various embodiments the lifetime of a battery included in the organic electroluminescent display may be extended. Also, the lifetime of the organic light emitting diode OLED is extended because heat generated in the DC-DC converter 400 is reduced.

While various aspects and features have been particularly shown and described with reference to certain embodiments, it will be understood by those of ordinary skill in the art that various changes in form and details may be made therein. The disclosed embodiments should be considered in descriptive sense only and not for purposes of limitation. Therefore, the scope of the invention is not strictly defined by the detailed description.

What is claimed is:

1. An organic electroluminescent display, comprising:

a pixel unit comprising:

a plurality of scanning lines arranged in a row direction, a plurality of data lines arranged in a column direction, and a plurality of pixels respectively disposed near intersections of the plurality of scanning lines and the plurality of data lines;

a DC-DC converter configured to generate a first power voltage and a second power voltage and to supply the first and second power voltages to the plurality of pixels, wherein the voltage difference between the first and second power voltages is determined based on a control signal; and a DC-DC converter controller, comprising:

a temperature sensor configured to measure a peripheral temperature of the organic electroluminescent display, a register configured to store a luminance level setting of the pixel unit, a selector configured to select a voltage difference level according to the peripheral temperature measured by the temperature sensor and the luminance level setting of the register; and a signal generator configured to generate the control signal based on the selected voltage difference level, wherein the selector comprises a storage unit configured to store one or more tables, each table comprising a plurality of voltage difference levels, wherein each voltage difference level corresponds to a potential luminance level setting, and wherein the selector is configured to select one of the tables according to the measured peripheral temperature, and to select the voltage level difference from the selected table according to the luminance level setting from the register, wherein the voltage difference levels correspond to the luminance levels in the table, and wherein the selector selects a first table if the measured peripheral temperature is higher than the reference temperature, and selects a second table if the measured peripheral temperature is lower than the reference temperature.

2. The organic electroluminescent display of claim 1, wherein the luminance level settings of higher value correspond to the voltage difference levels of higher value.

3. The organic electroluminescent display of claim 1, wherein each voltage difference level of the first table is less than the difference level of the second table which corresponds to the same luminance level setting.

4. A method of driving an organic electroluminescent display, the method comprising:

measuring a peripheral temperature of the organic electroluminescent display;

determining a luminance level setting of a pixel unit according to an input of a user;

selecting a voltage difference level according to the measured peripheral temperature and the luminance level setting; and generating a control signal for a DC-DC converter based on the selected voltage difference level, wherein the selecting the voltage difference level comprises:

determining whether the measured peripheral temperature is greater than a reference temperature;

selecting a first table when the measured peripheral temperature is greater than the reference temperature, and selecting a second table when the measured peripheral temperature is less than the reference temperature; and selecting a voltage difference level from the selected table according to the luminance level setting.

5. The method of claim 4, further comprising generating a power voltage according to the control signal, wherein the generating of the power voltage is performed by the DC-DC converter.

6. The method of claim 4, wherein the first and second tables store voltage difference levels which correspond to luminance level settings and the voltage difference levels of higher value correspond to the luminance level settings of higher value.

7. The method of claim 4, wherein each voltage difference level of the first table is less than the difference level of the second table which corresponds to the same luminance level setting.

8. An organic electroluminescent display, comprising:

a pixel unit comprising a plurality of pixels;

a DC-DC converter configured to generate a first power voltage and a second power voltage and to supply the first and second power voltages to the plurality of pixels, wherein the voltage difference between the first and second power voltages is determined based on a temperature of the display and a luminance level setting, wherein the DC-DC converter is configured to receive a control signal, and to generate the first and second power voltages according to the control signal; and a DC-DC converter controller configured to generate the control signal based on a temperature of the display and a luminance level setting, wherein the DC-DC converter controller comprises a comparator configured to compare the temperature of the display with a reference temperature.

9. The display of claim 8, wherein the luminance level setting is determined by an input from a user.

10. The display of claim 8, wherein the DC-DC converter controller comprises a storage unit configured to store one or more tables, each table comprising a plurality of voltage difference levels, wherein each voltage difference level corresponds to a potential luminance level setting, and wherein the DC-DC converter controller is configured to select one of the tables according to the measured peripheral temperature, and to select the voltage level difference from the selected table according to the luminance level setting from the register and to generate the control signal based on the selected voltage level difference.

11. The display of claim 10, wherein the DC-DC converter controller is configured to select a first table if the measured peripheral temperature is higher than the reference temperature, and to select a second table if the measured peripheral temperature is lower than the reference temperature.

12. The display of claim 11, wherein each voltage difference level of the first table is less than the difference level of the second table which corresponds to the same luminance level setting.

13. The display of claim 10, wherein the table values for the luminance level settings of higher value correspond to the table values for the voltage difference levels of higher value.

* * * * *